United States Patent [19]

Szakacs

[11] Patent Number: 4,892,365

[45] Date of Patent: Jan. 9, 1990

[54] TRACK UNIT FOR USE IN A VEHICLE TRACK ASSEMBLY

[76] Inventor: Geza C. Szakacs, 2168 Belle Vernon Dr., Rochester Hills, Oakland, Mich. 48309

[21] Appl. No.: 197,010

[22] Filed: May 4, 1988

[51] Int. Cl.[4] .................. B62D 55/21; B62D 55/18
[52] U.S. Cl. ...................... 305/58 R; 305/42; 305/58 PC; 305/57
[58] Field of Search ............ 305/39, 42, 58 R, 58 PC, 305/59, 57, 56, 51

[56] References Cited

U.S. PATENT DOCUMENTS

| | | | |
|---|---|---|---|
| 1,956,580 | 5/1934 | Knox | 305/59 |
| 2,387,387 | 10/1945 | Garber | 305/59 X |
| 2,390,542 | 12/1945 | Knox | 305/42 |
| 2,392,383 | 1/1946 | Hollenkamp | 305/57 |
| 2,409,502 | 10/1946 | Leguillon et al. | 305/42 X |
| 2,430,573 | 11/1947 | Krotz | 305/59 X |
| 2,731,304 | 1/1956 | Kubaugh | 305/42 |
| 2,738,236 | 3/1956 | Haushalter | 305/42 X |
| 3,357,750 | 12/1967 | Reynolds et al. | 305/58 PC X |
| 3,467,446 | 9/1969 | Seelbach et al. | 305/57 |

Primary Examiner—Russell D. Stormer
Attorney, Agent, or Firm—Peter A. Taucher; David L. Kuhn

[57] ABSTRACT

The invention is a double pin track unit comprising a track body, two bores extending transversely through the body, a track pin within each bore extending the length of each bore, links keyed to the pins and extending radially from the bores, sleeves keyed to the pins for separating the links, and elastomeric sleeves in the torroidal space between the outer diameter of the pin and the inner diameter of the bore.

14 Claims, 5 Drawing Sheets

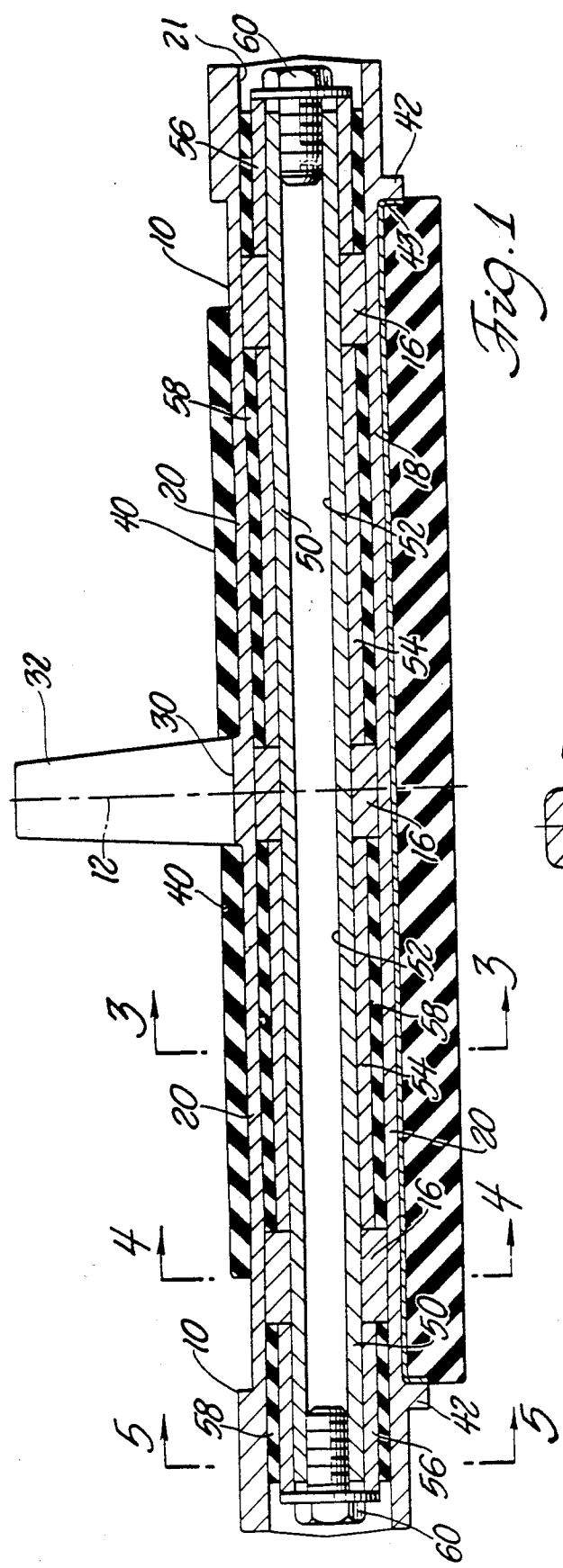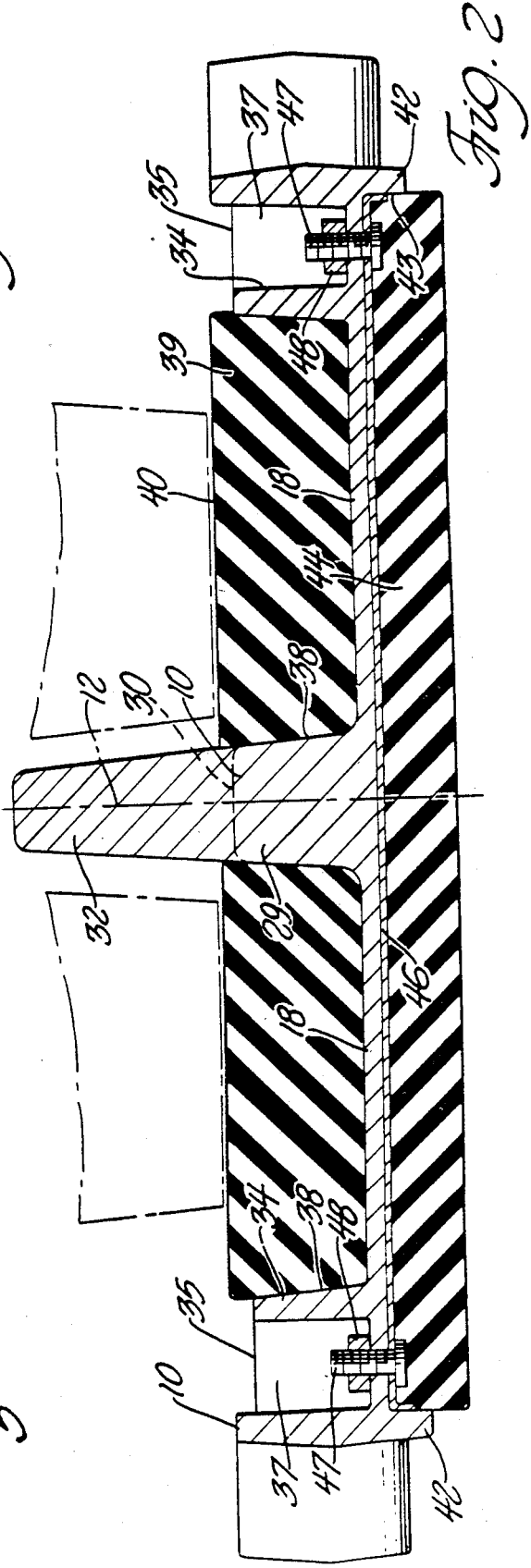

TRACK UNIT FOR USE IN A VEHICLE TRACK ASSEMBLY

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to a track unit usable on a vehicle for tractive engagement with the terrain surface, for thereby moving the vehicle along the terrain surface. Track units of this invention are especially designed for use on military tanks and personnel carriers.

The term "track unit" is here used to mean one section of an endless terrain-engagement assembly. Usually two such assemblies are used per vehicle, one assembly at the right side of the vehicle and another assembly at the left side of the vehicle.

A large number of individual track units (e.g. seventy five) are linked together to form one endless track assembly. Each assembly is trained around a drive sprocket at one end of the vehicle, an idler wheel at the other end of the vehicle, and a series of ground wheels spaced along the length of the vehicle.

Each individual track unit comprises an upstanding prong designed to enter grooves in the ground wheels to prevent lateral dislocation of the endless assembly from its designed operating plane. Openings are provided along side edge areas of the endless track assembly to accommodate teeth on the drive sprocket(s). Each drive sprocket mechanism comprises two axially-spaced sprocket wheels affixed to a common hub structure carried on an output shaft of the vehicle power plant.

My invention is concerned with the design of an individual track unit. The individual unit is of the "double pin" type, i.e. a track unit having a transverse pin at each of its ends. The pins on adjacent track units are connected by rigid links bridging the space between the track units.

Each track pin is mounted within an oversize bore in the associated track unit. An annular bushing of elastomeric material is packed around each pin to form a torsional connection between the pin and track unit.

Each elastomeric bushing seals the joint between the track pin and bore surface, such that dirt or moisture is prevented from entering into the joint and thereby producing excessive track pin wear or deterioration.

Some objects of my invention are to provide a double pin track unit wherein:
1. the track pin bushings have relatively large cylindrical surface areas.
2. the pin bushings are subjected to relatively low unit area forces in radial directions.
3. the track pad has a relatively large face area.
4. the track pad is subjected to relatively low unit area forces in directions normal to the terrain.
5. the track pad has a relatively long service life.
6. the track unit has no end connectors.
7. the links between adjacent track units are of unitary one-piece design.
8. the track-connection links have strong drive engagements with the associated track pins.
9. the track-connection links are subjected primarily to tensile loadings rather than bending forces.
10. the track body is a unitary one piece unit that defines surfaces at its outer edges for engaging sprocket teeth and includes an upstanding guide (prong) on its centerline for engaging ground wheels.
11. the tooth engaging surfaces on the track body have high-strength connections with the main section of the track body.

THE DRAWINGS

FIG. 1 is a sectional view through a track unit embodying my invention. FIG. 1 is taken on line 1—1 in FIG. 3.

FIG. 2 is a sectional view of the FIG. 1 track unit, taken on line 2—2 in FIG. 3.

THE DRAWINGS IN GREATER DETAIL

FIGS. 1 through 5 and 7 illustrate a track unit 8 embodying my invention. The track unit comprises a one piece track body 10, formed of steel or similar high strength material by a casting process or forging process. An imaginary longitudinal centerline (or centerplane) 12 extends through track body 10; an imaginary transverse centerline (centerplane) 14 extends through body 10, normal to centerline 12.

Figure 3:
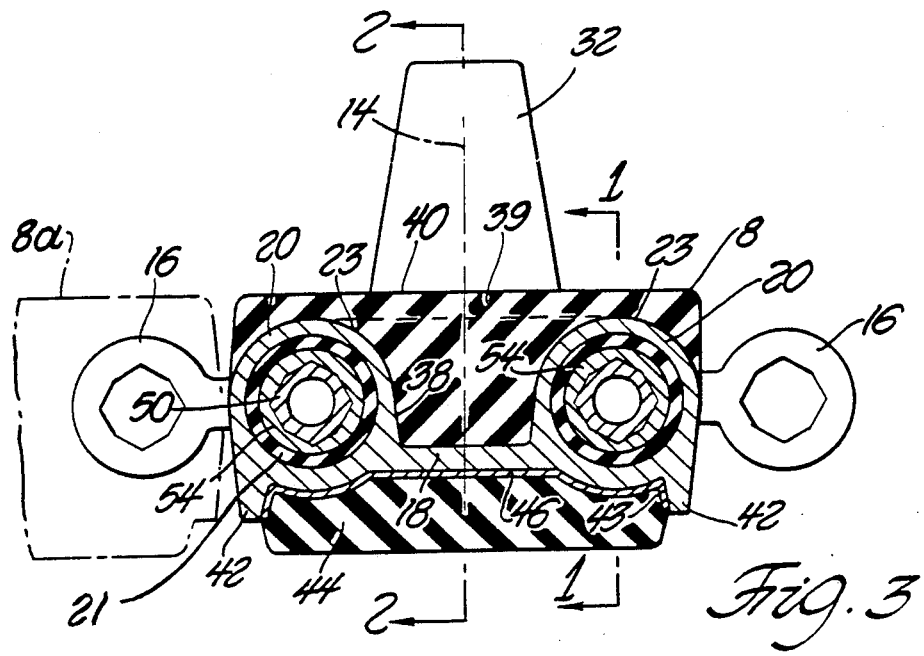
FIG. 3 is a sectional view taken on line 3—3 in FIG. 1.
Figure 7:
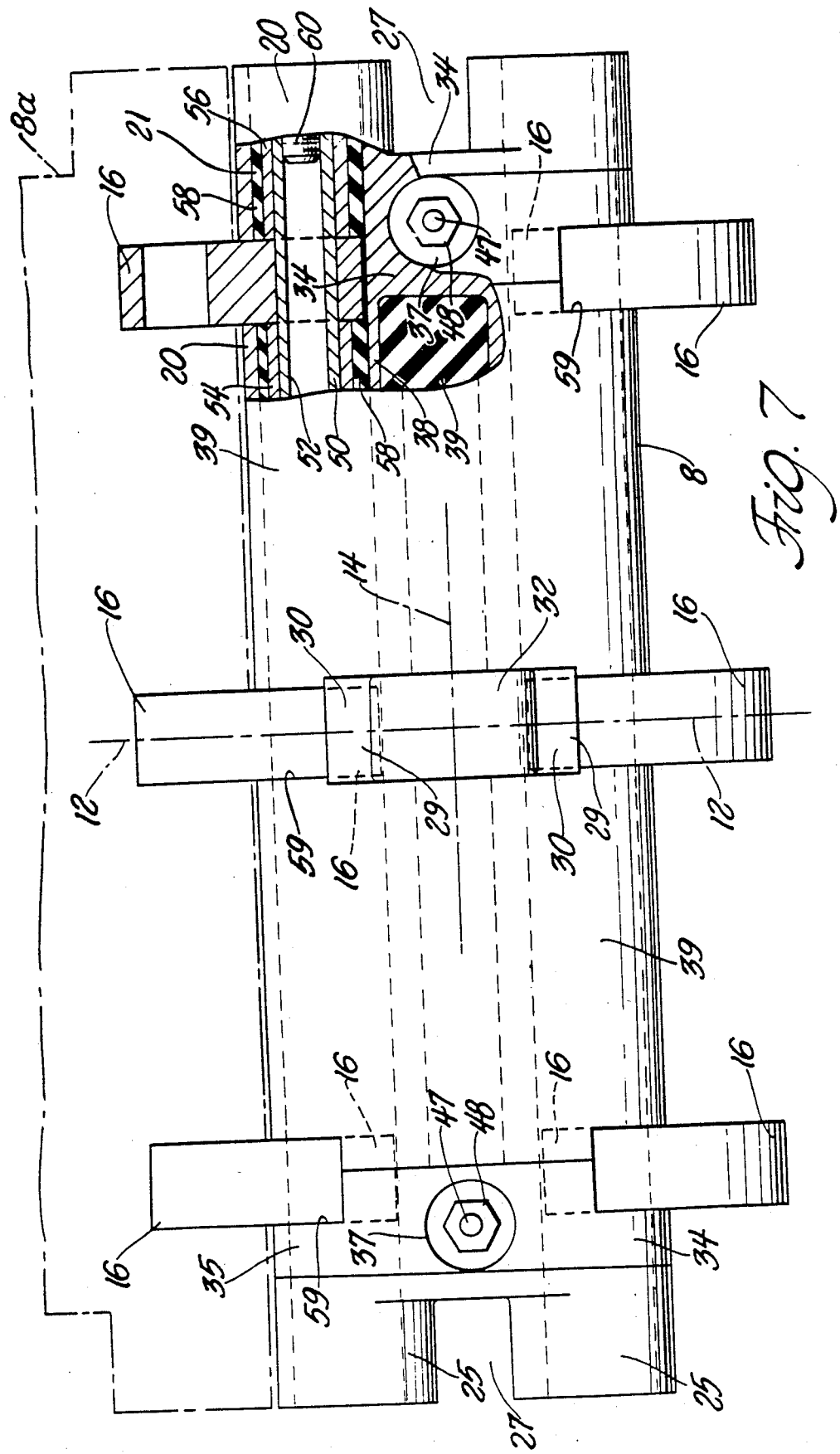
FIG. 7 is a top plan view of the FIG. 1 track unit.

Centerline 12 extends parallel to the movement direction line for the track unit. Centerline 14 parallels the hinge axes for the links that hingedly interconnect adjacent track units. FIGS. 3 and 7 partially illustrate, in dashed lines, an adjacent track unit 8a hingedly linked to the fully illustrated track unit.

TRACK BODY DESIGN

Track body 10 comprises a horizontal web wall 18 having a relatively thin wall thickness, e.g. one quarter inch. Wall 18 is strengthened by two tubular sections 20 extending transversely, i.e. parallel to transverse centerline 14. Each tubular section 20 extends entirely across the track body, i.e. from one side edge of the body to the other. These tubular sections are spaced equidistantly from transverse centerline 14, as seen in FIG. 3.

Each tubular section 20 has a cylindrical bore 21 extending therethrough and is externally contoured to provide curved external surfaces. As seen in FIG. 3, the upper external surface areas 23 of each tubular section 20 are of curved semi-circular contour. As seen in FIG.

5 the external surface areas 25 of each tubular section 20 (at the outboard ends of the track body) are of circular contour. As seen in FIG. 7, the space 27 between the end areas of tubular sections 20 is vacant to accommodate one tooth of a drive sprocket. The curved confronting surfaces 25 conform to the surface contours on the sprocket tooth.

Figure 4:
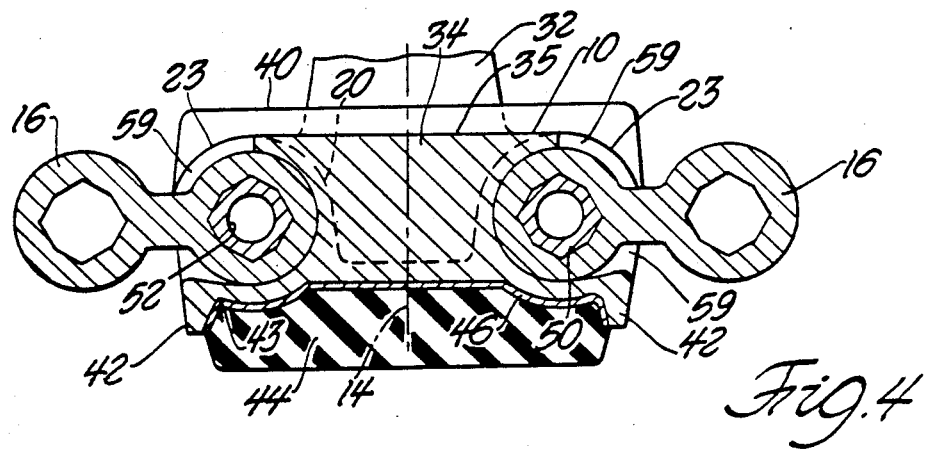
FIG. 4 is a sectional view taken on line 4—4 in FIG. 1.
Figure 5:
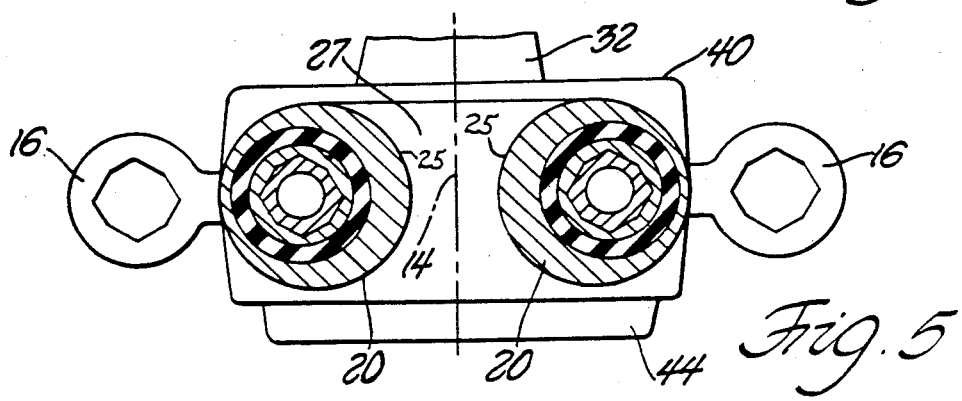
FIG. 5 is a sectional view taken on line 5—5 in FIG. 1.

As seen in FIGS. 4 and 7, track body 10 has machined slots 59 spaced along tubular wall sections 20. Each slot 59 has a transverse width slightly greater than the width of one of the links 16. As seen in FIG. 4, each slot 59 has a circumferential dimension slightly greater than the major diameter of the circular surface on link 16.

Referring now to FIGS. 1 and 2, track body 10 includes a central ridge 29 atop wall 18 and tubular sections 20. Ridge 29 extends along longitudinal center line 12 and the top of ridge 29 defines a central raised surface 30. Extending upwardly from surface 30 is prong 32 aligned for entry into an annular groove in an associated roadwheel. The prong is designed to interact with the roadwheels to prevent lateral dislocation of the track unit from its designed operating plane.

As seen in FIG. 2, track body 10 also includes upstanding walls 34 outboard from central ridge 29. Each upstanding wall 34 defines a raised upper surface 35 (FIG. 4) that merges into the contours on the associated tubular sections 20.

Each wall 34 defines an upwardly open pocket 37 accommodating a fastener means such as stud 47 and nut 48, by which track pad 44 is affixed beneath track body 10 on the undersurface of wall 18.

The central ridge 29 and walls 34 form the lateral boundaries of cavities 38 which are bounded at the forward and rear ends by tubular sections 20 (FIGS. 2 and 3). A high durometer elastomeric insert 39 fills each cavity 38. The upper surface 40 of each elastomeric insert constitutes a roadwheel-engagement surface. Dashed lines in FIG. 2 partially illustrate the roadwheel profile. As previously noted, the roadwheel has an annular groove therein that rolls over prong 32, such that the track unit is prevented from wandering from its designed operating plane.

Web wall 18 constitutes the primary wall of the track body. The aforementioned ridge 29 and walls 34 extend upwardly from wall 18 (when the track unit is engaged with the terrain). As shown in FIG. 2, each wall 34 defines a pocket 37 which divides the wall 34 into an outboard (or outside) segment and an inboard segment forming part of cavity 38. As seen in FIG. 3, tubular wall sections 20 are integrally merged with wall 18 such that edge areas of wall 18 form undersurfaces of the tubular sections. The tubular sections 20 cooperate with ridge 29 and walls 34 to form rectangular rigidifying structures to strengthen web wall 18 against bending stresses. Wall 18 is further strengthened by an endless downwardly-extending peripheral grouser (flange) 42 forming a shallow rectangular recepticle on the underside of wall 18.

The space circumscribed by grouser 42 constitutes a single cavity 43 that extends a substantial distance on either side of the longitudinal centerline 12, as seen in FIG. 2. Cavity 43 also extends a substantial distance on either side of the transverse centerline 14, as seen in FIGS. 3 and 4. Cavity 43 accommodates a pad assembly comprised of a single elastomeric pad 44 whose lower face is designed to engage the terrain surface, a backing sheet 46 bonded to the upper face of elastomeric pad 44 and studs 47 extending through backing sheet 46. The two laterally-spaced studs 47 are welded to the lower surface of back sheet 46. As seen in FIG. 2, studs 47 can be extended upwardly through circular holes in wall 18; nuts 48 can be threaded onto the studs to thereby removably retain the elastomeric pad in cavity 43.

The illustrated pad structure (elements 44, 46 and 47) can be replaced with differently structured pad units, e.g. a metallic unit or a cleat structure, as necessary to meet different conditions (terrain).

TRACK LINKAGE DESIGN

Linkage, as that term is used here, is the connecting means for movably attaching individual track units 8 to one another. As previously noted, track unit 8 is of the double pin type in that it has two similarly constructed track pins extending transversely through the aforementioned tubular wall sections 20 of the track body 10.

Each track pin comprises a single rod 50 of non-circular cross section extending substantially the full width dimension of the track body, as seen in FIG. 1. Rod 50 may have a circular hole 52 therein for weight reduction purposes.

Each rod 50 has three track-connection links 16 keyed thereto at spaced points along the rod length; each link 16 has non-circular openings therethrough mated to the external contour of rod 50 to prevent relative rotation between rod 50 and links 16. Spacer sleeves 54 are telescoped onto rod 50 to space the central link 16 from the two outboard links 16. Two other sleeves 56 are telescoped onto rod 50 to locate the outboard links 16 at desired points on rod 50. Each sleeve 54 or 56 has a circular outer surface and a non-circular inner surface conforming to the rod 50 contour so that sleeves 54 or 56 do not rotate about rod 50.

Figure 6:
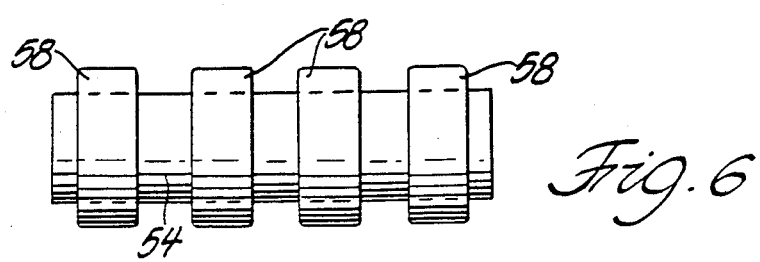
FIG. 6 is an elevational view of a structural detail used in the FIG. 1 track unit.

Each sleeve 54 or 56 has annular elastomeric members 58 (FIG. 6) bonded to its outer surface. Prior to insertion of each sleeve into the bore 21 in tubular wall structure 20 the major diameter of each elastomeric member 58 is greater than the bore diameter. As the sleeve (54 or 56) is forced into the bore the associated elastomeric members 58 are radially compressed; members 58 are thereby squeezed to spread out in axial directions, thereby completely filling the annular space between the sleeve (54 or 56) and the cylindrical bore in tubular wall section 20.

CONNECTING THE TRACK UNITS

Figure 8:
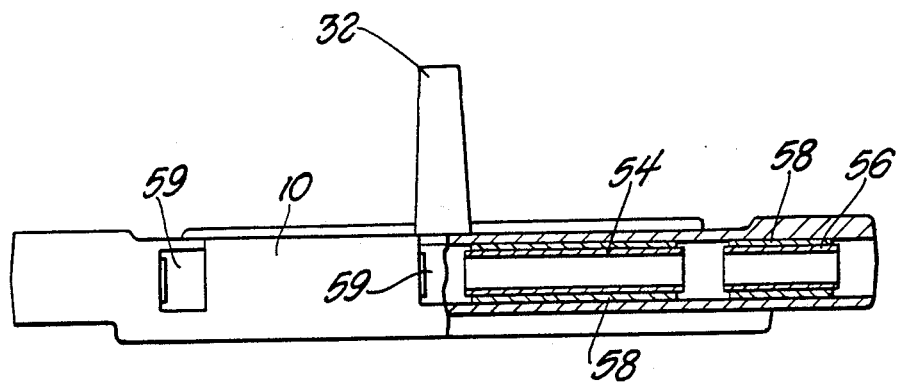
FIG. 8 is a view, partially in section, showing the FIG. 1 track unit in a partially assembled condition.

Prior to connecting track units 8, spacer sleeves 54, 56 and cylindrical elastomeric members 58 are fit into the bores of tubular sections 20 of track bodies 10. FIG. 8 fragmentarily illustrates track body 10 after the elastomeric members 58 and spacer sleeves 54 and 56 have been installed in the bores in tubular sections 20 (but before installation of links 16 and rod 50). The sleeves 54, 56 may be spaced apart by an axial distance slightly greater than the width of links 16 to facilitate entry of links 16 into slots 59. The elastomeric members 58 do not extend axially along the entire length of the sleeves. Members 58, 54 and 56 are installed at the factory with the hexagonal inner surfaces on sleeves 54 and 56 aligned in a circumferential sense, such that rod 50 can be later inserted into the sleeves to occupy the FIG. 1 position.

The track units are connected together by inserting rods 50 into the various sleeves 54. Prior to insertion of each rod 50 into sleeves 54 the various connector links 16 are inserted into slots 59. After each rod 50 is in its FIG. 1 position, screws 60 are screwed into threaded openings in rod 50 to prevent axial dislocation of the rod from a centered position. Head areas on screws 60 abut the ends of sleeves 56 to exert tension forces on the rod.

Rod 50 is slightly shorter than the combined length of the sleeves and links, such that screws 60 apply compression forces to the sleeve-link assembly and tension forces to the rod. The elastomeric members 58 exert high radial forces on the track body bore to preclude axial dislocation of the associated sleeves 54 or 56.

During use of track members 8, elastomeric members 58 act as torsional connections between the track body and the assembly comprised of rod 50 and the four associated sleeves 54, 54, 56, 56. The inside of each sleeve is keyed to rod 50; the outer surface of each sleeve is circular, whereby the assembly moves as a unit to torsionally load the elastomeric connections 58 (e.g. during movement around the drive sprockets).

Each of the three links 16 is keyed directly to the common rod 50, such that strong drive connections are obtained between the links and the track pin. Rod 50 is the major structural component of the track pin.

DISASSEMBLING THE TRACK UNITS

To break the linked connection between track units 8, it is necessary to completely remove a rod 50 from its installed position; one or both of the screws 60 must be unthreaded from the rod 50 before rod 50 can be removed. Sleeves 54, 56 and elastomeric members 58 return to their FIG. 8 position wherein sleeves 54, 56 and elastomeric members 58 are axially spaced at distances greater than the width of links 16.

Rod 50 can be removed from its installed position without disturbing the positions of sleeves 54, 54, 56, 56. Links 16 are removed by pulling them out of slots 59.

The link connections between adjacent track units can be reestablished by reversing the process, i.e. installing links 16 is slots 59 and moving rods 50 into the non-circular holes in the sleeve-link assemblies.

FIG. 9 CONSTRUCTION

Figure 9:
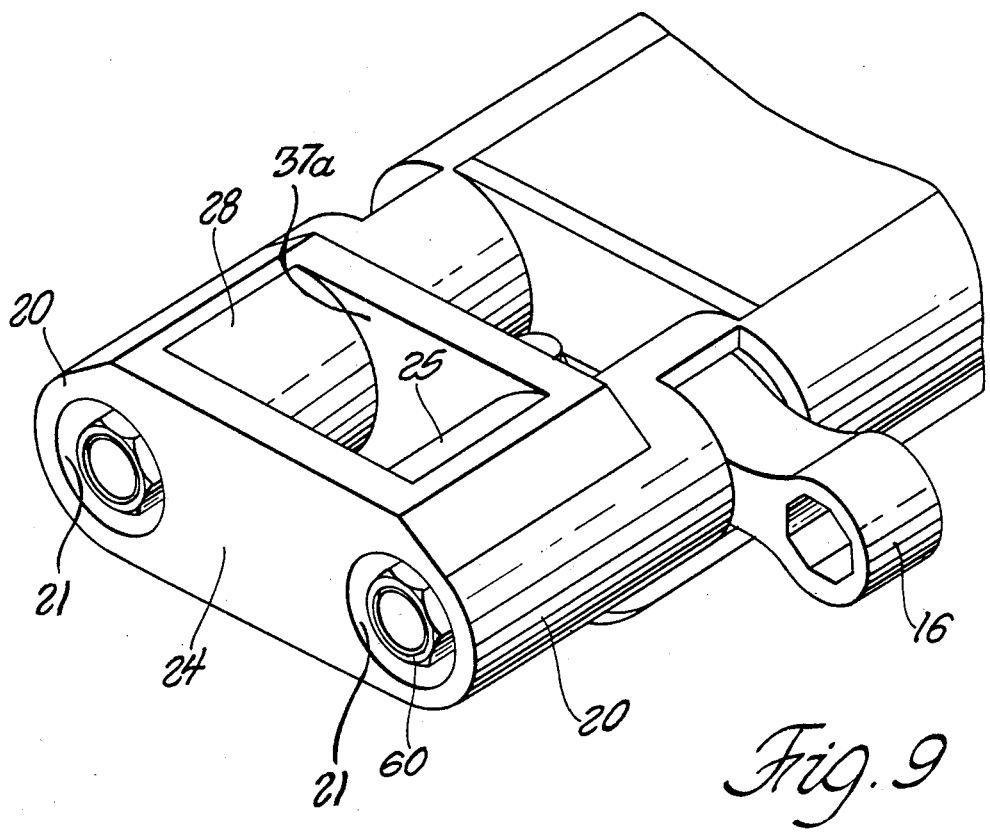
FIG. 9 is a fragmentary perspective view of another track unit embodying my invention.

The FIG. 9 construction is generally similar to the FIG. 1 construction, except that the track body includes a wall 24 interconnecting tubular sections 20 at the extreme outboard ends of the tubular sections. The vacant space 28 inboard from wall 24 accommodates a tooth of a non-illustrated drive sprocket. In the FIG. 9 arrangement pocket 37a is enlarged (compared to pocket 37 in FIGS. 2 and 7) for weight reduction purposes.

Wall 24 acts as a strengthening reinforcement for the tubular sections 20 at the high stress zones of engagement with the drive sprocket.

FIG. 10 CONSTRUCTION

Figure 10:
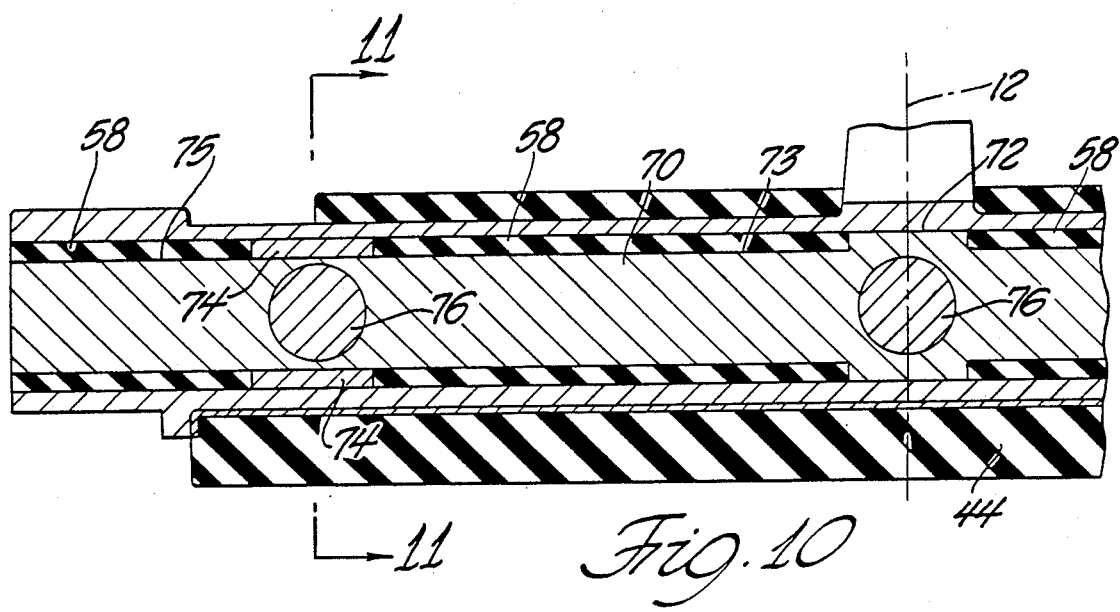
FIG. 10 is a fragmentary sectional view taken in the same direction as FIG. 1, but illustrating another form that the invention might take.
Figure 11:
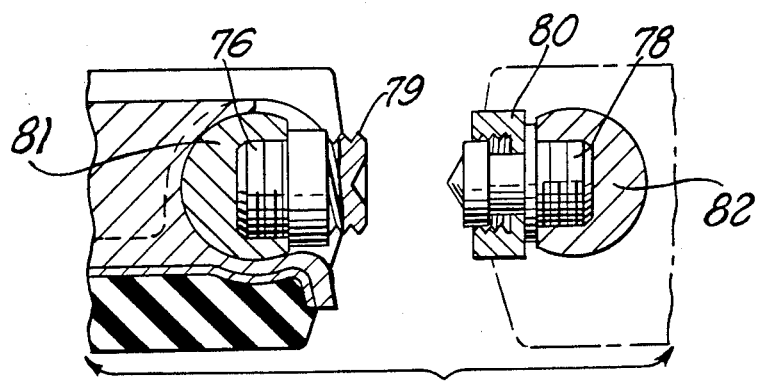
FIG. 11 is a sectional view taken on line 9—9 in FIG. 8.

FIGS. 10 and 11 illustrate another alternate embodiment of the invention. In this arrangement track body 10, elastomeric inserts 39 and pad 44 are formed in the same fashion as the FIG. 1 embodiment. The FIG. 10 construction departs from the FIG. 1 structure in that the track pin comprises an elongated shaft 70 having a circular enlargement 72 in line with longitudinal centerline 12. The elastomeric doughnuts 58 are bonded directly to reduced diameter sections 73 and 75 of the shaft structure.

There are two short sleeve sections 74 press-fit onto the reduced diameter section of the shaft structure inboard from its outer ends. One of these sleeve sections is shown in FIG. 10; the other sleeve section is located at the opposite (non-illustrated) end area of the shaft structure. The shaft-elastomer subassembly is constructed before installation in the track body. The subassembly is then inserted as a unit into the bore of the track body. During use of the track unit, sleeve sections 74 remain rotationally and axially fixed on shaft 70.

FIG. 11 illustrates an alternate structure for link 16 that might be used to join track pins on adjacent track units. A first stud 76 is threaded into a threaded opening in one track pin 81. A second stud 78 is threaded into a threaded opening in the other track pin 82.

The exposed end of stud 76 is threaded, as at 79, to mate with internal threads on a nut 80. Nut 80 is freely rotatable on a smooth cylindrical section of stud 78. When the adjacent track units are moved toward one another the ends of the two studs 76 and 78 abut together. Nut 80 can then be turned to thread onto the threaded end of stud 76, thereby forming a link structure between the two track units. The number and spacing of the defined links may correspond to that of the FIG. 1 arrangement.

The described link structure can be disconnected by unthreading the various nuts 80. As previously noted, FIG. 11 is merely illustrative of various link constructions that might be used in practicing the invention.

Figure 12:
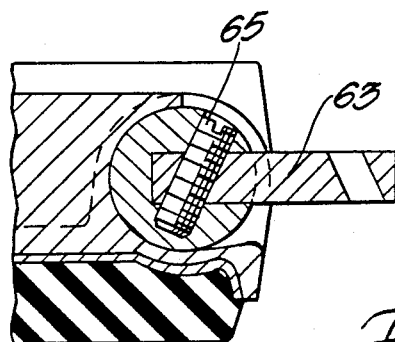
FIG. 12 is a view taken in the same direction as FIG. 11, but illustrating a different connector usable in practice of the invention.

FIG. 12 illustrates another link structure that might be used to interconnect the track pins on adjacent track bodies. Each link structure comprises a thick bar 63 extending into a slot in the track pin. A screw 65 is threaded into the bar and pin to provide a disengageable connection.

FEATURES OF THE INVENTION

One feature of interest is the relatively large surface areas on the track bushings 58. As seen in FIG. 1, elastomeric bushings 58 extend substantially the entire width of the track body, except for the spaces occupied by links 16. There are no "unused" zones.

The large bushing surface area translates into relatively low unit area forces on the bushings (torsionally and radially), thus contributing to an increased service life.

Another beneficial feature of my proposed arrangement is the one piece design for track body 10. In most conventional center-guided designs the track body is divided into two half sections (mirror images) on opposite sides of the track centerline. The two piece track body does not have the equivalent strength of my proposed single piece track body.

Another beneficial consequence of my one-piece track body is a large track pad area (lower face of pad 44). Most two piece track units of the double pin, center guide, type have two spaced apart track pads located on either side of the track unit centerline. The space between the pads reduces the total track pad area. With my improved "single pad" arrangement I achieve a center-guided track (prong 32) without sacrificing pad area. The large total pad area means lower unit area forces and longer track pad life.

Another desirable feature is the absence of end connectors, and the presence of strong direct force connections between the drive sprockets and the track units. In conventional track units of the "double pin" type the track pins on adjacent units are linked together by end connectors; the drive sprockets act on end surfaces of the end connectors to deliver drive forces to the track.

With my improved arrangement the sprocket teeth act on curved surfaces 25 formed directly on the track body; there are no end connectors between the sprocket surfaces and the track units. Drive forces transmitted through the end connectors tend to loosen the connections between the end connectors and the track pins. With my "no end connector" design the forces tending to disturb the track pins are no longer present.

I also believe the one-piece link design shown in the preferred embodiment is advantageous over known multi-piece link designs. In my proposed arrangement each link 16 has a strong integral drive connection with the associated rod 50. The links are not likely to slip on the track pins, since the entire circumference of rod 50 is used for drive purposes.

In the proposed design, guide prong 32 is an integral part of the one piece track body. Thus the track body has direct connections with the roadwheels and the sprocket teeth. No secondary parts are involved in the driving-guiding operations.

The drawings show a three-link track body design, i.e. three links attached to each track pin. A different number of links could be used, depending on the anticipated loadings to be handled by the link assembly. In a five-link design additional links could be arranged midway between the central link 16 and the two outboard links (FIG. 1); each sleeve 54 would be replaced by two shorter links.

I wish it to be understood that I do not desire to be limited to the exact details of construction shown and described for obvious modifications will occur to a person skilled in the art, without departing from the spirit and scope of the appended claims.

I claim:

1. A double pin track unit comprising a track body having a transverse centerline; two cylindrical bores extending continuously through the track body parallel to the transverse centerline; a track pin located entirely within each bore; each track pin comprising a single rod extending substantially the full width of the track body; a plurality of links extending radially out of the bore, the links keyed within the bore to the rod, the links having a curved end surface congruently and adjacently facing an inner peripheral surface of the bore; sleeves keyed to the rod, the sleeves being alternated and abutted with the links along the entire length of the rod such that each link is between two sleeves; means for holding sleeves at the ends of the rod in fixed axial relation to the rod, whereby the rod, all the sleeves and the links are axially fixed relative to one another; and an annular elastomeric bushing surrounding each sleeve within the associated transverse bore.

2. The track unit of claim 1 wherein the sleeve holding means comprises a screw threaded onto an end surface of the rod.

3. The track unit of claim 1 wherein: at least one of the cylindrical bores has a peripheral wall surrounding the rod; the peripheral wall defines access openings through which the links extend from the rod; the access openings have pairs of opposed sidewalls normal to the axis of the rod; and the link has complimentarily opposed flat surfaces bearing against the sidewalls of the access opening, whereby relative motion between the links and the track body is limited to rotation about the axis of the track pin.

4. The track unit of claim 3 wherein the sidewalls of the access openings are coplanar with axial ends of the sleeves, whereby the sleeves aid the opposed sidewall in limiting the relative motion between the links and the track body.

5. The track unit of claim 4 wherein each link has a transverse hole therethrough contoured to the cross-sectional shape of the rod, whereby each link completely encircles the rod.

6. The track unit of claim 5 wherein each link is of one-piece construction.

7. A double pin track unit comprising a track body having a transverse centerline and a tractive ground engagement surface; a metal frame having a continuous planar web extending along the transverse centerline parallel to the tractive surface; tubular sections integral with the planar web and parallel with the transverse centerline, the longitudinal axes of the tubular sections being more remote from the tractive surface than is the elongate web; the tubular sections extending the width of the track body and defining two cylindrical bores extending through the track body parallel to the transverse centerline; a track pin located within each bore; an annular elastomeric bushing surrounding each track pin within the associated transverse bore; and at least two links affixed to each track pin at spaced points along the pin length; said track body having two integral curved confronting surfaces formed on the outer diametrical surface of each tubular member for engaging teeth of a track driving sprocket; the confronting surfaces on one tubular member oriented toward the confronting surfaces on the other tubular member to define sprocket tooth reception spaces.

8. The track unit of claim 6 wherein a first track-connection link is located on the longitudinal centerline of the track body, and two other track connection links are located near, but not at, the outer ends of the track pin.

9. The track unit of claim 7 wherein the tube-like ribs define slots through which the links pass to engage the track pins, the slots having opposed sidewalls perpendicular to the rib member axis, the sidewalls bearing against faces on the links which are also perpendicular to the rib member axis, whereby relative movement between the links and the track body is limited to rotation about the rib member axes.

10. The track unit of claim 9 wherein the tube-like rib members are continuous across the entire width of the track unit.

11. The track unit of claim 10 wherein the track body is symmetric with respect to a plane passing through the transverse centerline.

12. A double pin track unit comprising:
a track body having a transverse centerline, a tractive ground engagement surface and a metal frame having a continuous planar web extending along the transverse centerline parallel to the tractive surface wherein the track body is symmetric with respect to a plane passing through the transverse centerline perpendicularly to the tractive ground engagement surface;
tube-like rib members integral with the planar web and parallel with the transverse centerline, the longitudinal axes of the tube-like rib members being more remote from the tractive surface than is the elongate web, the tube-like rib members extending the width of the track body and defining two cylindrical bores extending through the track body parallel to the transverse centerline;
a track pin rotatable within each bore, each track pin comprising a single rod of constant, non-circular cross section extending substantially the full width of the track body;

a plurality of links keyed to the rod;

sleeves keyed to the rod, the sleeves being alternated and abutted with the links along the entire length of the rod such that each link is between two sleeves;

means for holding the sleeves at the ends of the rod in fixed axial relation to the rod, whereby the rod, all the sleeves and the links are axially fixed relative to one another, the rod being axially slideable out of the links and sleeves when the holding means is disengaged from the sleeves at the end of the rod, whereby the links can be removed from the track body;

an annular elastomeric bushing surrounding each sleeve within the associated transverse bore;

wherein at least one of the cylindrical bores has a peripheral wall surrounding the rod, the peripheral wall defines access openings through which the links extend from the rod, the access openings have pairs of opposed sidewalls normal to the axis of the rod, and the link has complimentarily opposed flat surfaces bearing against the sidewalls of the access opening, whereby relative motion between the links and the track body is limited to rotation about the axis of the track pin;

wherein the sidewalls of the access openings are coplanar with axial ends of the sleeves, whereby the sleeves aid the opposed sidewall in limiting the relative motion between the links and the track body.

13. The track unit of claim 12 wherein a plurality of longitudinal frame members are disposed on the planar web and extend between the tube-like rib members so as to form one or more tray-shaped recesses open away from the tractive ground engagement surface, each recess receiving an elastomeric pad.

14. The track unit of claim 13 further including a transverse flange extending along each rib member, longitudinal flanges on the web connecting the transverse flanges so as to form a tray-like recess faced toward the ground engaging surface, the tray-like recess receiving a ground engagement pad releasably attached to the track body.

* * * * *